United States Patent
Hubbard

(10) Patent No.: US 10,330,156 B2
(45) Date of Patent: Jun. 25, 2019

(54) AXLE ROLLER BEARING SEAL SHROUD

(71) Applicant: AMSTED RAIL COMPANY, INC., Chicago, IL (US)

(72) Inventor: Paul A. Hubbard, Petersburg, VA (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 0 days.

(21) Appl. No.: 15/674,183

(22) Filed: Aug. 10, 2017

(65) Prior Publication Data

US 2019/0048935 A1 Feb. 14, 2019

(51) Int. Cl.
| | |
|---|---|
| *F16C 33/78* | (2006.01) |
| *F16C 19/38* | (2006.01) |
| *B61F 15/22* | (2006.01) |
| *B61F 15/02* | (2006.01) |

(52) U.S. Cl.
CPC .......... *F16C 33/7813* (2013.01); *B61F 15/22* (2013.01); *F16C 19/386* (2013.01); *F16C 33/7886* (2013.01); *B61F 15/02* (2013.01); *F16C 2326/10* (2013.01)

(58) Field of Classification Search
CPC .......... F16C 33/7813; F16C 19/386; F16C 33/7886; F16C 2326/10; B61F 15/22; B61F 15/02
See application file for complete search history.

(56) References Cited

U.S. PATENT DOCUMENTS

| | | | | |
|---|---|---|---|---|
| 2,923,581 | A | * 2/1960 | Wahrenberger | B61F 15/22 384/161 |
| 3,628,837 | A | 12/1971 | Otto | |
| 3,713,709 | A | * 1/1973 | Staiger | B60B 17/002 295/36.1 |
| 4,200,345 | A | * 4/1980 | Walker | B61C 17/08 277/578 |
| 5,024,449 | A | * 6/1991 | Otto | B61F 15/22 277/353 |

(Continued)

OTHER PUBLICATIONS

Non-Final office action filed in U.S. Appl. No. 15/678,602, dated Mar. 14, 2018, 9 pages.

(Continued)

*Primary Examiner* — Thomas R Hannon
(74) *Attorney, Agent, or Firm* — Amsted Industries Incorporated

(57) ABSTRACT

A bearing assembly comprising a bearing cup having two ends, with a pair of outer raceways formed one adjacent each end of the bearing cup. A pair of bearing cones form a pair of inner raceways. Two rows of tapered roller bearings with each row received between one inner raceway and one outer raceway. A pair of wear rings are provided, each having a first axially inwardly directed end in engagement with an outwardly directed end of a bearing cone. A pair of seals each having a first end fitted into one into one of the bearing cup cylindrical counterbores. Each seal has a second end including a resilient element to form a seal with one of the wear rings. A second end of each wear ring is received in a cylindrical counterbore in each annular backing ring. A circular shroud is located radially outer and adjacent to one seal.

16 Claims, 3 Drawing Sheets

(56) References Cited

U.S. PATENT DOCUMENTS

| | | | |
|---|---|---|---|
| 5,487,611 A * | 1/1996 | Dreschmann | B61F 15/22 |
| | | | 384/478 |
| 5,511,886 A | 4/1996 | Sink | |
| 6,126,321 A * | 10/2000 | Fetty | F16C 19/386 |
| | | | 384/459 |
| 8,360,651 B1 * | 1/2013 | Fetty | F16C 33/7813 |
| | | | 384/459 |
| 8,790,014 B2 * | 7/2014 | Shimizu | F16C 33/80 |
| | | | 277/412 |
| 2012/0082407 A1 * | 4/2012 | Fetty | B61F 15/22 |
| | | | 384/459 |
| 2014/0301685 A1 * | 10/2014 | Shimizu | F16C 33/80 |
| | | | 384/459 |
| 2016/0061266 A1 * | 3/2016 | Baart | F16C 33/805 |
| | | | 384/459 |

OTHER PUBLICATIONS

International Search Report and Written Opinion in International Application No. PCT/US18/45101, dated Sep. 19, 2018, 7 pages.

\* cited by examiner

US 10,330,156 B2

AXLE ROLLER BEARING SEAL SHROUD

BACKGROUND

This invention relates to sealed shaft bearing assemblies and more particularly to an improved axle bearing assembly employing a seal shroud.

Typical railway freight car axle roller bearing assemblies utilize two rows of tapered roller bearings preassembled into a self-contained package for mounting onto journals at the ends of axles. In railway freight car axle bearings of this type, the two rows of tapered roller bearing elements are fitted one into an outer race at each end of a common bearing cup, and a pair of bearing cones defining the inner races normally have an inner diameter dimension to provide an interference fit with the axle journal. A cylindrical sleeve or spacer positioned between the cones provides an accurate spacing of the inner races on the journal. Seals mounted within each end of the bearing cup provide sealing contact with wear rings positioned one against the outer end faces of the bearing cones at each end of the assembly. The entire assembly is prelubricated and adapted to be pressed as a unit onto the end of the axle journal.

An end cap mounted on the end of the axle by bolts threaded into bores into the axle engages the outboard wear ring and clamps the entire assembly on the end of the axle and applies an axial compressive load to the assembly between the axle fillet and the end cap.

An object is to provide a separate shroud that can assist in keeping the lubrication within the axle bearing assembly and to keep abrasives and other contaminants out of the axle bearing assembly. Ideally, such shroud would be able to be installed on new axle bearing assemblies as a final assembly step or retrofitted onto existing bearings in service on railway freight cars.

SUMMARY

Railway freight car axle roller bearing assemblies utilize two rows of tapered roller bearings preassembled into a self-contained package for mounting onto journals at the ends of axles. The two rows of tapered roller bearing elements are fitted one into an outer race at each end of a common bearing cup, and a pair of bearing cones defining the inner races normally have an inner diameter dimension to provide an interference fit with the axle journal. A cylindrical sleeve or spacer positioned between the cones provides an accurate spacing of the inner races on the journal. A seal mounted within each end of the bearing cup provide sealing contact with wear rings positioned one against the outer end faces of the bearing cones at each end of the assembly. The entire assembly is prelubricated and adapted to be pressed as a unit onto the end of the axle journal.

An end cap mounted on the end of the axle by bolts threaded into bores into the axle engages the outboard wear ring and clamps the entire assembly on the end of the axle and applies an axial compressive load to the assembly between the axle fillet and the end cap.

A separate shroud is provided radially outside of the seal. The shroud is typically a flexible tape or gasket circular structure that can assist the seal in keeping the lubrication within the axle bearing assembly and to keep abrasives and other contaminants out of the axle bearing assembly. Ideally, such shroud would be able to be installed on new axle bearing assemblies as a final assembly step or retrofitted onto existing bearing axle roller assemblies in service on railway freight cars. Together with the seal, the shroud assists in assuring optimal performance of the axle bearing assembly by keeping lubrication inside of the tapered roller bearings and abrasives outside of the tapered roller bearings.

DESCRIPTION OF THE PREFERRED EMBODIMENT

Figure 1:
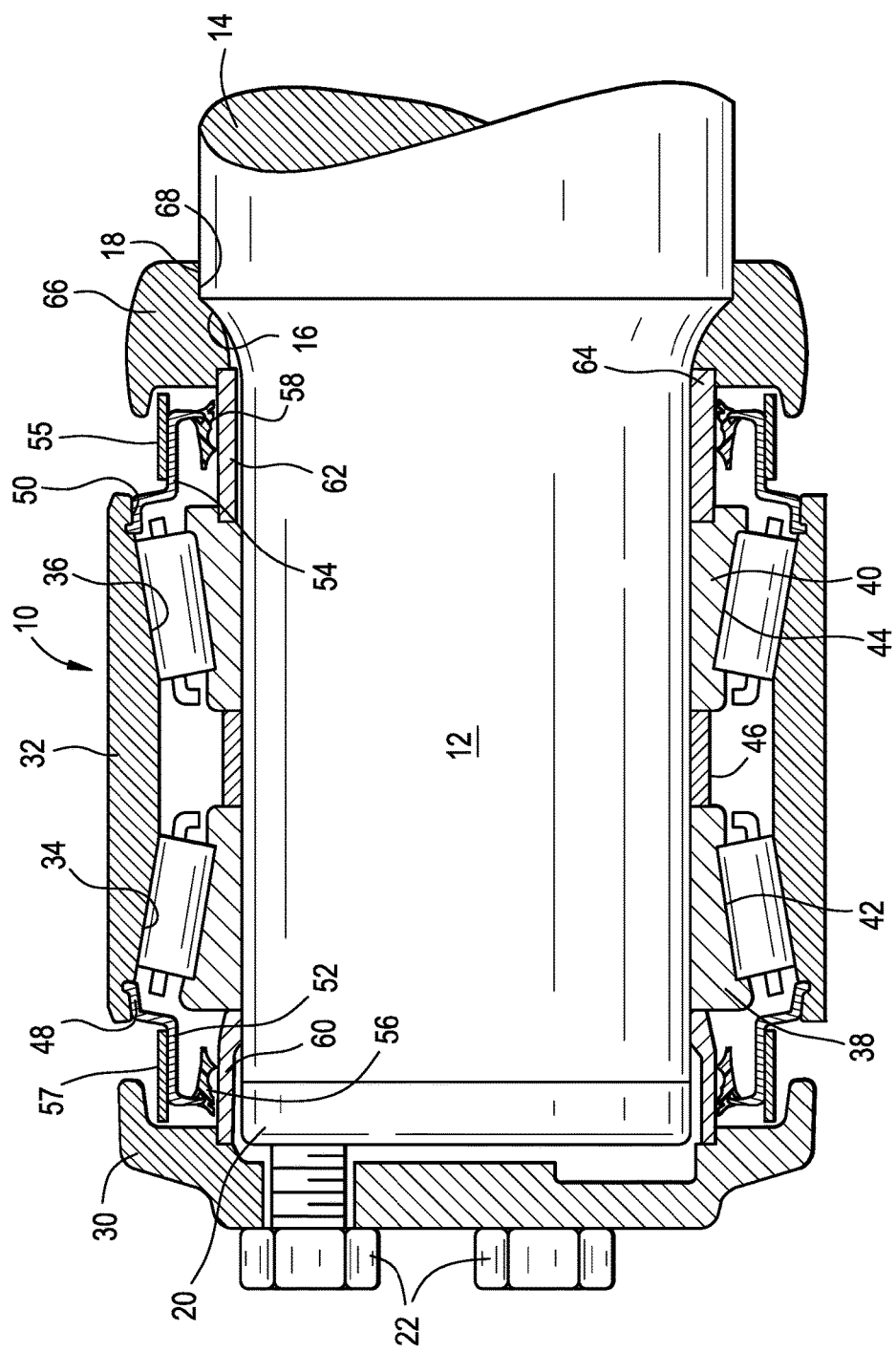
FIG. 1 is a side view, in partial cross section, of a tapered roller bearing assembly mounted on an axle journal according to a first embodiment of the present invention.

Referring now to the FIG. 1, a bearing assembly 10 is shown mounted on a journal 12 near the end of a shaft or axle 14, typically a rail car axle. Journal 12 is machined to very close tolerances and terminates at its axially inner end in a contoured fillet 16 leading to a cylindrical shoulder portion 18 of axle 14. At the free end of axle 14, journal 12 terminates in a slightly conical of tapered guide portion 20 dimensioned to facilitate installation of the bearing assembly onto the journal. A plurality of threaded bores (not shown) are formed in the end of axle 14 for receiving threaded cap screws, or bolts, 22 for mounting a bearing retaining cap 30 on the end of the shaft to clamp the bearing in position.

Bearing assembly 10 is preassembled and filled with lubricant before being mounted and clamped onto journal 12 by the cap 30. The bearing assembly includes a unitary bearing cup 32 having a pair of raceways 34, 36 formed one adjacent each end thereof which cooperate with a pair of bearing cones 38, 40 respectively forming the bearing inner races to support two rows of tapered roller bearings 42, 44, respectively. A center spacer 46 is positioned between cones 38, 40 to maintain the cones in accurately spaced relation relative to one another.

Bearing cup 32 is provided with cylindrical counterbores 48, 50 at its opposite ends outboard of the raceways 34, 36, and a pair of seal assemblies 52, 54 are pressed one into each of the cylindrical counterbores 48, 50. The seals 52, 54 can include resilient sealing elements 56, 58, respectively, which cooperate with and form a seal with a pair of sleeve-like seal wear rings 60, 62, respectively, having their inwardly directed ends in engagement with the outwardly directed ends of bearing cones 38, 40, respectively. The opposite end of wear ring 62 is received in a cylindrical counterbore 64 in the axially outwardly directed end of an annular backing ring 66 which, in turn, has a counterbore at its other end which is dimensioned to be received in interference relation on the cylindrical shoulder 18 of shaft 14.

Circular shroud 55 is located radially outer to seal 54 and circular shroud 57 is located radially outer to seal 52. Shroud 55 assists seal 54 and shroud 57 assists seal 52 in keeping lubricant within the space between cup 32 and cones 38 and 40 and in keeping abrasives and water out of the space.

Figure 5:
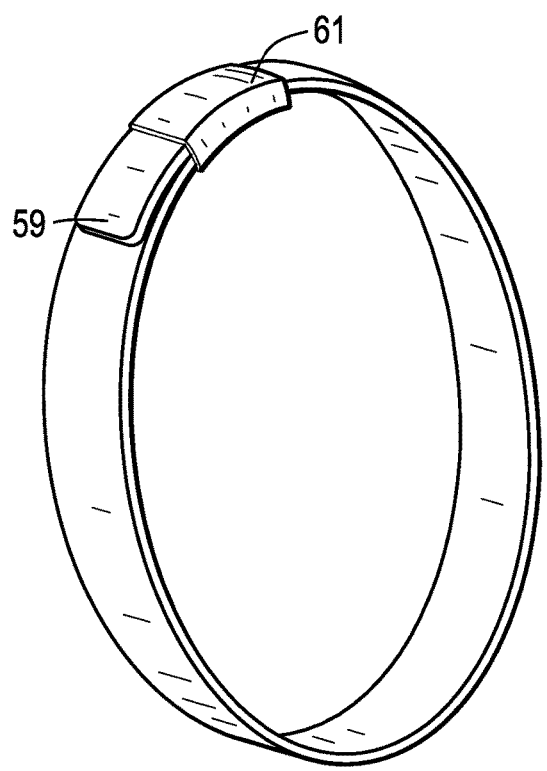
FIG. 5 is a perspective view of a shroud in accordance with an embodiment of the present invention.

Circular shroud 55 is shown in FIG. 5 as being comprised of a flexible tape or gasket that includes a closing mechanism such as a tab 59 and a receiver 61. Such shroud arrangement allows the shroud to be initially installed in a bearing assembly being manufactured or retrofitted onto on in service bearing assembly. Circular shroud 57 is similar with similar properties. Circular shrouds 55 and 57 are typically comprised of a synthetic plastic like material with stretching and strength properties to allow installation and service as part of a railway axle bearing assembly 10. Suitable plastics or other synthetic materials for shrouds 55 and 57 include: rubber, engineering plastics, RTV silicone, EPDM, Neoprene, Nitrile, etc.

Figure 2:
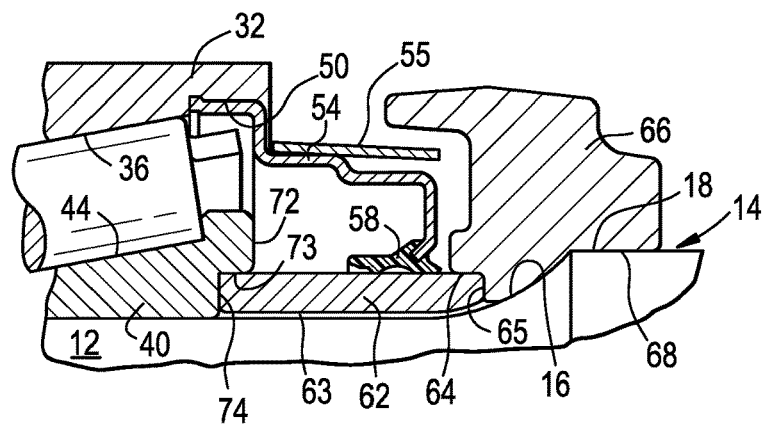
FIG. 2 is a partial sectional view of a tapered roller bearing assembly according to a first embodiment of the present invention.

Counterbore 64 and the outer diameter of wear ring 62 at its axially inwardly directed end are also dimensioned to provide an interference fit so that the wear ring must be pressed into the backing ring 66. Between counterbores 64 and 68, the backing ring is accurately machined to provide a contoured inner surface complimentary to and engaging the contoured fillet 16 at least in the area adjacent the shoulder 18 when the bearing assembly is mounted on the journal. The outwardly directed end of wear ring 60 bears against the retaining cap 30. In the embodiment of FIGS. 1 and 2, the counterbore 64 preferably terminates in a substantially radially disposed abutment surface 65 located closer to the radially smaller end of the fillet 16 than to the shoulder 18. The axial location of the abutment surface of counterbore 64 relative to the fillet 16 will depend on the bearing configuration including the axial length of the overall bearing assembly.

Inner seal wear ring 62 with an inner surface 63 spaced from the journal surface along the entire length of the wear ring and by radially fixing each end of the seal wear ring in concentric relation relative to the journal surface. The conventional press fit is provided between the axially inwardly directed end of wear ring 62 within the counterbore 64, with the interference fit providing a high radially compressive load in the end of the wear ring. Similarly, the end face 72 of inner cone 40 is provided with a counterbore 73 terminating in a radial face 74 for abutting the adjacent end face of the wear ring 62, with the cylindrical bore surface 73 dimensioned to receive the outer cylindrical surface portion of the wear ring 62 in interference relation, again, with the interference being such as to provide a substantial radial compressive force in the end portion of the wear ring received within the counterbore in cone 40.

When the end cap 30 is installed, with the proper torque on the cap screws, the compressive axial load will be retained in the entire bearing assembly between the cap 30 and the backing ring 66.

Figure 3:
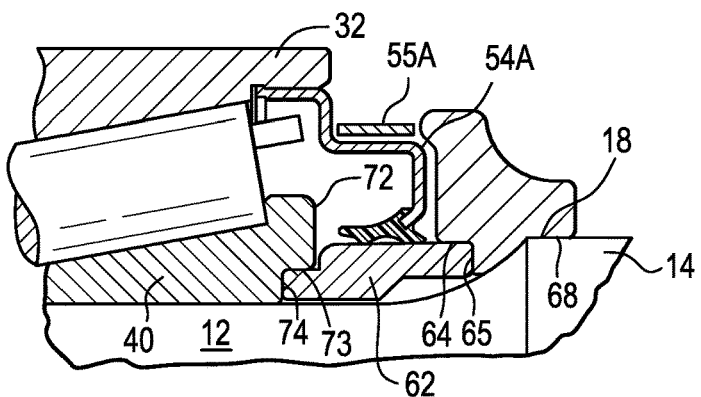
FIG. 3 is a partial sectional view of a tapered roller bearing assembly according to a second embodiment of the present invention.

Referring now to FIG. 3, an alternate embodiment of the invention is illustrated in a shorter version of the bearing assembly of the type currently enjoying increased usage in the railway industry. Since the basic construction and operation of the embodiment in FIG. 3 is essentially the same as that described above with respect to FIGS. 1 and 2, like reference numbers are applied to corresponding parts of the two embodiments. Thus, in FIG. 3, the wear ring 62 is illustrated as being substantially shorter, in axial length, than the corresponding wear ring of FIGS. 1 and 2, and has its axially inner end received in interference relation in counterbore 64 in the backing ring and its opposite or axially outer end received in interference relation in the counterbore 68 in the end face 72 of cone 40. In such short bearing arrangements, it is conventional for the backing ring not to extend down along the fillet for as great an axial distance and therefore in this embodiment the wear ring is constructed in a "stepped" configuration with the inner surface having a smaller diameter over substantially half its length closest the cone and a larger diameter over the remainder of its length, i.e., the portion closer to the backing ring. Similarly, the outer surface of the wear ring is stepped, or smaller adjacent the cone and larger adjacent the backing ring. Preferably the wear ring 62 of the FIG. 3 embodiment has a central portion that is of greater radial thickness than the end portions, thereby providing a greater resistance to bending.

Circular shroud 55A is located radially outer to seal 54A. Shroud 55A assists seal 54A in keeping lubricant within the space between cup 32 and cone 40 and in keeping abrasives and water out of the space.

Figure 4:
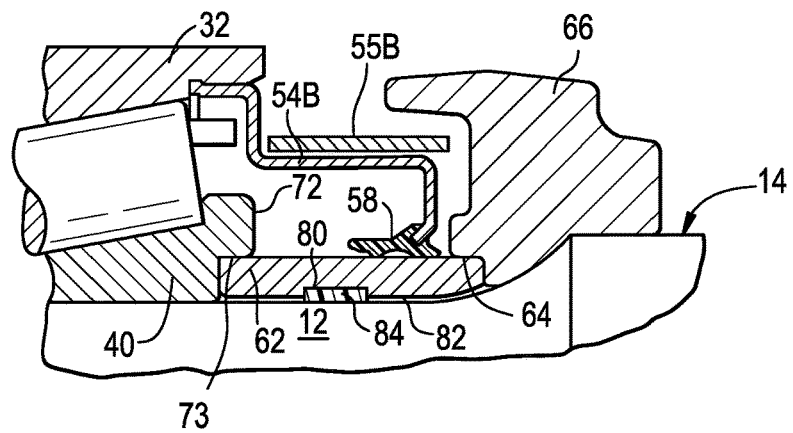
FIG. 4 is partial sectional view of a tapered roller bearing assembly according to a third embodiment of the present invention.

The embodiment of the invention illustrated in FIG. 4 employs an inner seal wear ring having overall dimensions similar to the wear ring 62 of the embodiment shown in FIGS. 1 and 2, and again, since the basic construction and function of the various embodiments are similar, like reference numerals are employed to designate corresponding parts in the various views. Thus, in FIG. 4, the wear ring 62 is shown as having its axially inner end received in interference relation in the counterbore 64 of backing ring 66, and its opposite end received in interference relation within the counterbore 73 in the end face 72 of cone 40 in the same manner described above with references to FIGS. 1-3. In this FIG. 4 embodiment, however, an annular groove or recess 80 is formed in the inner surface 82 of wear ring 62, preferably at a location about equally spaced from its opposite ends, and an annular spacer ring 84 of dimensionally stable, low friction synthetic resin material such as polyvinylchloride is mounted within the groove 80. The outer circumference of the spacer ring 84 has a diameter which is slightly greater than the diameter of groove 80 so that, when the spacer ring is installed within the groove, the spacer ring is under a slight compressive load. The depth of groove 80 is such that the spacer ring may be inserted into the seal wear ring by pressing operation, and telescoped along the inner surface of the seal wear ring until it snaps into the groove 80.

Circular shroud 55B is located radially outer to seal 54B. Shroud 55B assists seal 54B in keeping lubricant within the space between cup 32 and cone 40 and in keeping abrasives and water out of the space.

What is claimed is:

1. A bearing assembly comprising:
   a bearing cup having two outer ends,
   a pair of radially outer raceways formed one adjacent each outer end of the bearing cup,
   a pair of bearing cones forming a pair of radially inner raceways and having outwardly directed ends adjacent the outer ends of the bearing cup,
   two rows of tapered roller bearings, each row received between one radially inner raceway and one radially outer raceway,
   a center spacer positioned between the bearing cones to maintain the bearing cones in spaced relation relative to one another,
   the bearing cup having a cylindrical counterbore at each outer end radially outboard of the raceways,
   first and second wear rings rotatable relative to the bearing cup about an axis, wherein the first wear ring has a first axially inwardly directed end in engagement with the outwardly directed end of one of the bearing cones and the second wear ring has a first axially inwardly directed end in engagement with the outwardly directed end of the other bearing cone, first and second seals, wherein the first seal has a first end fitted into one of the bearing cup cylindrical counterbores and the second seal has a first end fitted into the other of the bearing cup cylindrical counterbores, the first seal having a second end including a resilient element to form a seal with the first wear ring and the second seal having a second end including a resilient element to form a seal with the second wear ring, an annular backing ring, a second end of the first wear ring received in a cylindrical counterbore in an end of the annular backing ring, a gap between the bearing cup and the annular backing ring having a predetermined axial distance thereacross, a circular shroud located radially outward from and adjacent to the first seal, an elongate, flexible strap of the circular shroud having opposite ends and a width along the axis that is at least equal to the axial distance of the gap between the bearing cup and the annular backing ring to resist ingress of abrasives between the first seal and the annular backing ring, and a receiver of the circular shroud at one of the ends of the flexible strap configured to receive the other end of the flexible strap.

2. The bearing assembly of claim 1 wherein
the annular backing ring defines an annular recess extending about the first wear ring and the circular shroud extends into the annular recess.

3. The bearing assembly of claim 1 wherein
the flexible strap is made of a synthetic material.

4. The bearing assembly of claim 1 wherein
the receiving end allows the circular shroud to be assembled into a circular shroud of adjustable circumference.

5. The bearing assembly of claim 1 wherein
the width of the flexible strap is greater than the axial distance of the gap between the bearing cup and the annular backing ring.

6. The bearing assembly of claim 1 wherein
the flexible strap is made of a plastic material.

7. The bearing assembly of claim 1 wherein
the flexible strap is made of rubber, neoprene, or nitrile.

8. The bearing assembly of claim 1 wherein
the flexible strap is received in the gap between the bearing cup and the annular backing ring.

9. A bearing assembly comprising:
a bearing cup having two outer ends,
a pair of radially outer raceways formed one adjacent each outer end of the bearing cup,
a pair of bearing cones forming a pair of radially inner raceways and having outwardly directed ends adjacent the outer ends of the bearing cup,
two rows of tapered roller bearings each row received between one radially inner raceway and one radially outer raceway,
the bearing cup having a cylindrical counterbore at each end radially outboard of the raceways, first and second wear rings rotatable relative to the bearing cup about an axis, wherein the first wear ring has a first axially inwardly directed end in engagement with the outwardly directed end of one of the bearing cones and the second wear ring has a second axially inwardly directed end in engagement with the outwardly directed end of the other bearing cone, and first and second seals, wherein the first seal has a first end fitted into one of the bearing cup cylindrical counterbores and the second seal has a first end fitted into the other of the bearing cup cylindrical counterbores, the first seal having a second end including a resilient element to form a seal with the first wear ring and the second seal having a second end including a resilient element to form a seal with the second wear ring, an annular backing ring, a second end of the first wear ring received in a cylindrical counterbore of the annular backing ring, a gap between the bearing cup and the annular backing ring having a predetermined axial distance thereacross;

a circular shroud located radially outward from and adjacent to the first seal;

an elongate, flexible strap of the circular shroud having opposite ends and a width along the axis sized to span the gap between the bearing cup and the annular backing ring to resist ingress of abrasives between the first seal and the annular backing ring, and a receiver of the circular shroud at one of the ends of the flexible strap configured to receive the other end of the flexible strap.

10. The bearing assembly of claim 9 wherein
the backing ring defines an annular recess extending about the first wear ring and the circular shroud extends into the annular recess.

11. The bearing assembly of claim 9 wherein
the flexible strap includes a synthetic material.

12. The bearing assembly of claim 9 wherein
the receiving end allows the circular shroud to be assembled into a circular shroud of adjustable circumference.

13. The bearing assembly of claim 9 wherein
the width of the flexible strap is greater than the axial distance of the gap between the bearing cup and the annular backing ring.

14. The bearing assembly of claim 9 wherein
the flexible strap is made of a plastic material.

15. The bearing assembly of claim 9 wherein
the flexible strap is made of rubber, neoprene, or nitrile.

16. The bearing assembly of claim 9 wherein
the flexible strap is received in the gap between the bearing cup and the annular backing ring.

\* \* \* \* \*